US010207184B1

(12) United States Patent
Leung et al.

(10) Patent No.: US 10,207,184 B1
(45) Date of Patent: Feb. 19, 2019

(54) DYNAMIC RESOURCE ALLOCATION FOR GAMING APPLICATIONS

(71) Applicant: Amazon Technologies, Inc., Reno, NV (US)

(72) Inventors: Hok Peng Leung, Redmond, WA (US); Geoffrey Scott Pare, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 150 days.

(21) Appl. No.: 15/464,550

(22) Filed: Mar. 21, 2017

(51) Int. Cl.
*A63F 13/00* (2014.01)
*A63F 13/358* (2014.01)
*H04L 12/911* (2013.01)
*H04L 29/06* (2006.01)

(52) U.S. Cl.
CPC ............ *A63F 13/358* (2014.09); *H04L 47/70* (2013.01); *H04L 65/1063* (2013.01); *H04L 65/1069* (2013.01); *H04L 67/38* (2013.01)

(58) Field of Classification Search
CPC .......................... G06F 17/30244; G06K 9/6253
See application file for complete search history.

(56) References Cited

U.S. PATENT DOCUMENTS

2005/0228856 A1* 10/2005 Swildens ............... G06F 9/50
709/200
2010/0121700 A1* 5/2010 Wigder ............... G06Q 10/06
705/14.25

* cited by examiner

*Primary Examiner* — Reginald Renwick
(74) *Attorney, Agent, or Firm* — Hogan Lovells US LLP

(57) ABSTRACT

Shared electronic resources can be allocated for a gaming application on a dynamic basis. A package of game content and configuration can be used to allocate an appropriate amount of resource capacity. Task-based instances can be launched as needed and terminated once a gaming session has completed. In order to account for relatively long load times, a number of pre-warmed task-based instances can be allocated that can load the game server functionality up to a determined state. The number of pre-warmed instances can be based on a number of different factors, such as an amount of unused capacity across a shared resource environment. When a request for a session is received, a pre-warmed instance is selected to be upgraded to a game server instance to serve the game session for the request. Pre-warmed instances can be reclaimed if capacity is needed for other purposes.

20 Claims, 9 Drawing Sheets

DYNAMIC RESOURCE ALLOCATION FOR GAMING APPLICATIONS

BACKGROUND

Users are increasingly performing tasks using remote computing resources, which may be offered through a shared-resource environment. This has many advantages, as users do not have to purchase and maintain dedicated hardware and software, and instead can pay for only those resources that are utilized at any given time, where those resources typically will be managed by a resource provider. In some cases, however, this can result in customers having excess resources allocated as the customers need to have sufficient resources to support varying demand. While a customer can potentially purchase additional resources, this can potentially result in additional excess at time of low customer usage and it can take a long time for the resources to be configured and available, particularly for functions such as those offered by a multiplayer game server.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for management of resource allocation for an application such as a multiplayer network-based game. In particular, various approaches provide for the dynamic allocation of electronic resources on an as-needed basis. A customer can provide a package of game content and data that can be used to allocate an appropriate amount of resource capacity to function as a game server for a gaming session. That package can be used to launch task-based instances as needed, which can be terminated once a session has completed in order to allocate only the amount of resources needed to support the game for the customer. In order to account for relatively long load times for some game servers, a number of pre-warmed task-based instances can be allocated that can load the game server functionality up to a determined point, such as where the server is not yet ready to serve customer requests. The number of pre-warmed instances can be based on a number of different factors, such as an amount of unused capacity across a shared resource environment. When a player request for a session is received, a pre-warmed instance can be selected to be upgraded to a game server instance which can then more quickly be available to serve the game session for the request. The pre-warmed instances can also be reclaimed if the capacity is needed for other purposes.

Various other functions can be implemented within the various embodiments as well as discussed and suggested elsewhere herein.

Figure 1:
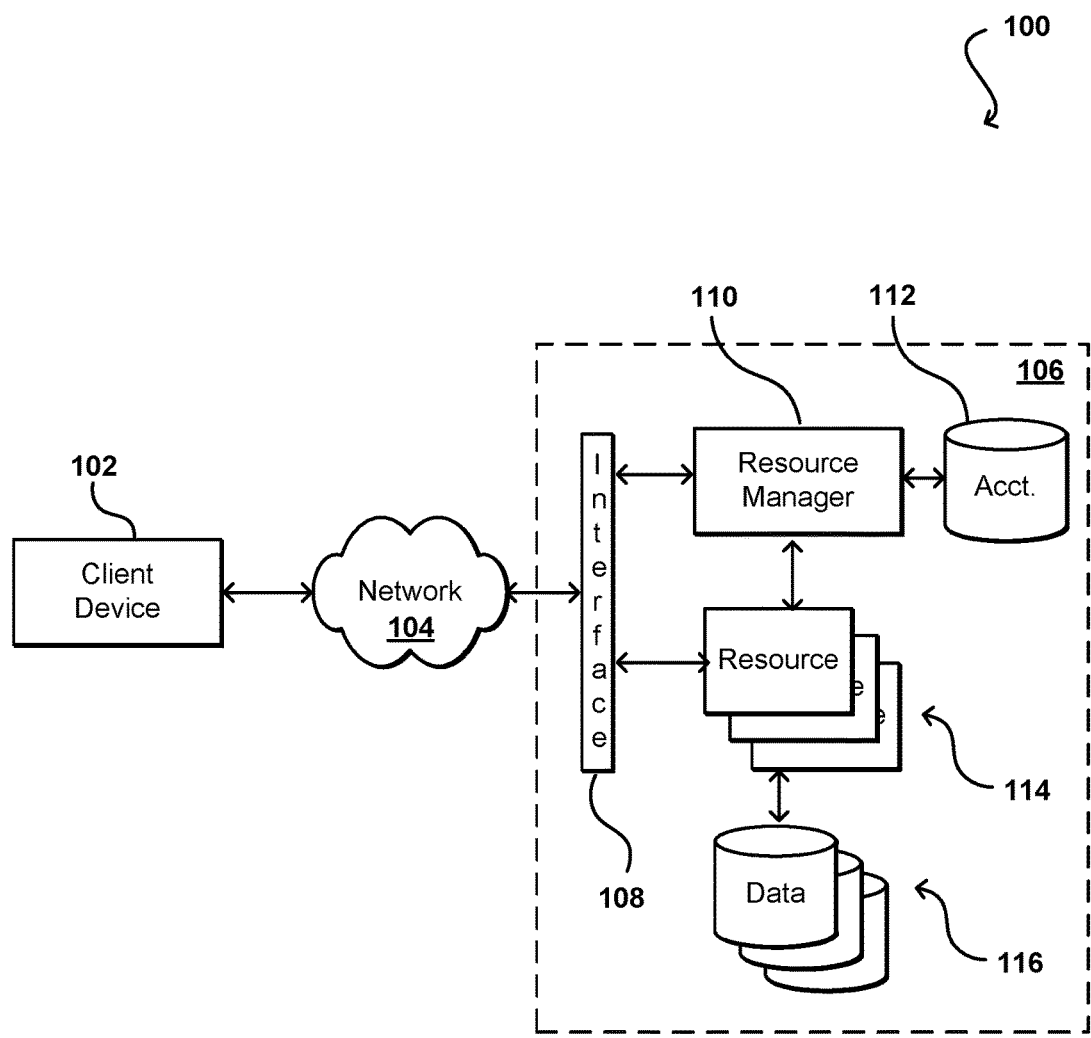
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a multi-tenant resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 2:
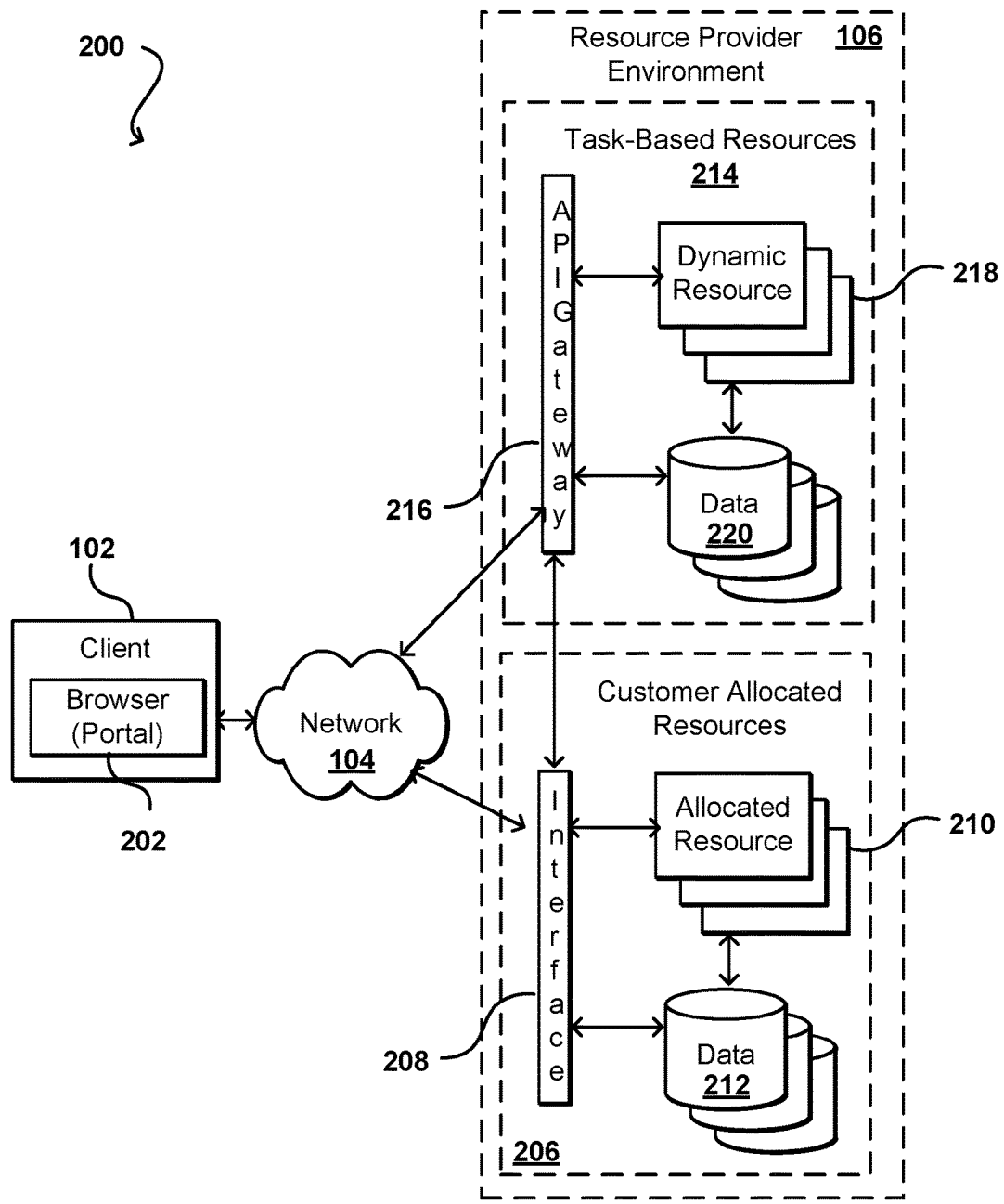
FIG. 2 illustrates an example resource environment for providing task-based resource allocation for gaming applications that can be used in accordance with various embodiments.

As mentioned, the resources in such an environment can be allocated for any of a number of different purposes for performing a variety of different tasks. As an example, one of the resources can be allocated under a customer account where the customer is a game developer or other such entity. The customer can provide access to the various resources to users (e.g., employees or contractors) under the credentials or roles for that account. As an example, FIG. 2 illustrates an example computing environment 200 wherein a client device 102 is able to submit requests over at least one network 104 to be received by an interface layer of a resource provider environment 106. It should be understood that reference numbers may be carried over between figures for similar elements, for simplicity of explanation, but that such usage should not be interpreted as a limitation on the scope of the various embodiments unless otherwise specifically stated. In this example, the client device 102 is able to call into two different interface layers, although the interfaces could be part of a single layer or multiple layers in other embodiments. In this example, there can be a set of resources, both computing resources 210 and data resources 212, among others, allocated on behalf of the customer in the resource provider environment 106. These can be physical and/or virtual resources, but during the period of allocation the resources (or allocated portions of the resources) are only accessible using credentials associated with the customer account. These can include, for example, gaming servers and game databases that are utilized over a period of time for various customer applications. The client device 102 can also make calls into an API gateway 216, or other such interface layer, of a task-based resource environment 214, or sub-environment. In such an environment, as is discussed in more detail later herein, portions of various resources can be allocated dynamically and on a task-specific basis. There can be resources allocated to perform a specific type of processing, and those resources can be allocated on an as-needed basis where the customer is only charged for the actual processing in response to a specific task. Approaches in accordance with various embodiments can enable customers, such as game developers, to leverage both types of allocations in their applications. This can include, for example, the ability to include on-demand cloud resource support for gaming applications and other such offerings.

Figure 3:
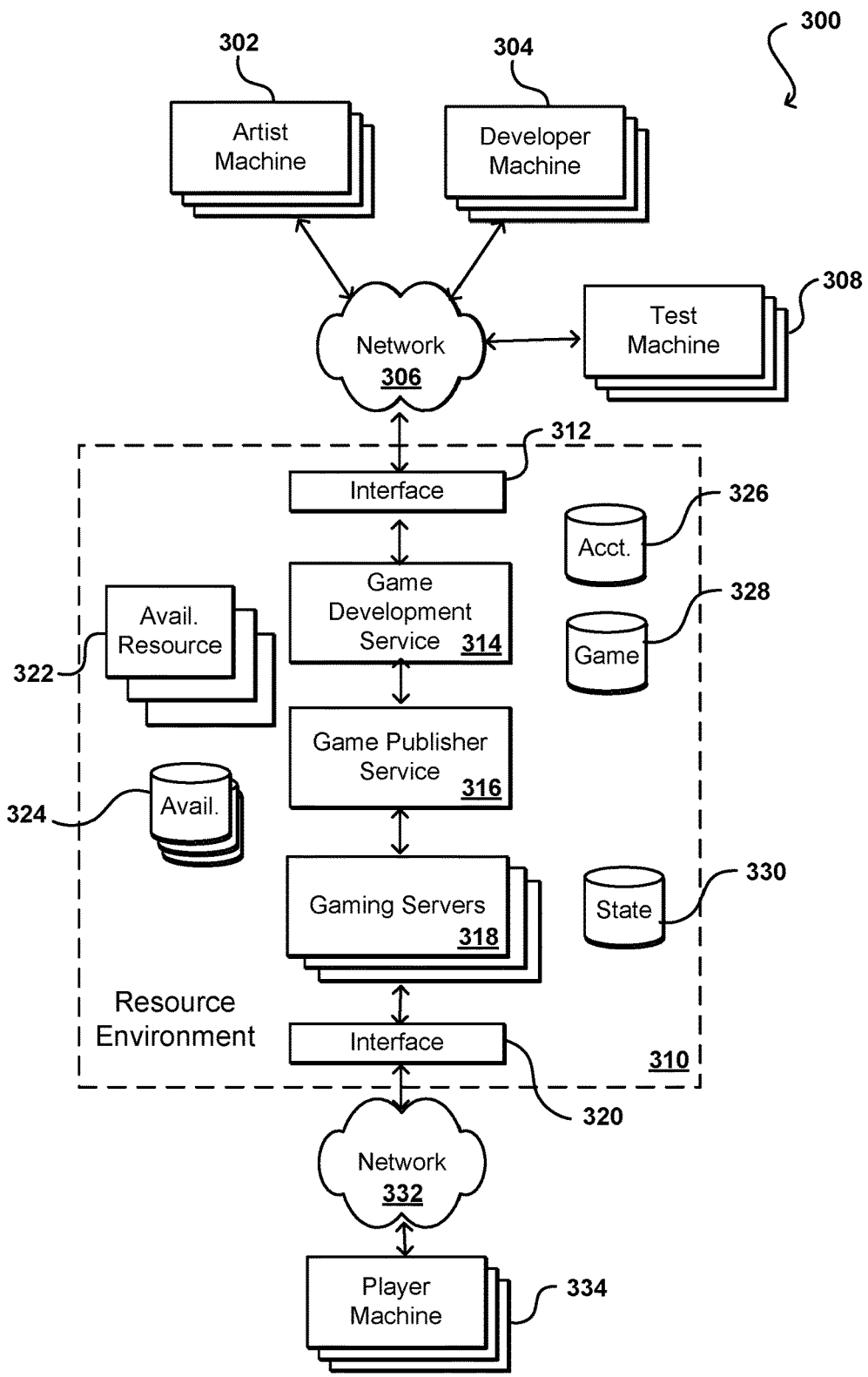
FIG. 3 illustrates a gaming pipeline that can be used in accordance with various embodiments.

FIG. 3 illustrates an example environment 300 in which aspects of the various embodiments can be implemented. In this example, users are able to utilize various client device 302, 304 to submit requests across at least one network 306 to a resource provider environment 310. The client devices can include any appropriate electronic device operable to send and receive requests, messages, or other such information over an appropriate network and convey information back to a user of the device. Examples of such client devices include personal computers, tablet computers, smart phones, notebook computers, and the like. There may be different types of client devices used by different types of users, as different machines 302 might be appropriate for artists generating graphical content than machines 304 that would be appropriate for developers generating code. The at least one network 306 can include any appropriate network, including an intranet, the Internet, a cellular network, a local area network (LAN), or any other such network or combination, and communication over the network can be enabled via wired and/or wireless connections. The resource environment 310 can include any appropriate components for receiving requests and returning information or performing actions in response to those requests. As an example, the service provider environment might include computing resources 322, such as Web servers and/or application servers for receiving and processing requests, then returning content or information in response to the request. The environment can also include various repositories 324 that can be allocated for use by, or on behalf of, various users, customers, or applications of the environment.

In various embodiments, the resource environment 310 may include various types of electronic resources that can be utilized by multiple users for a variety of different purposes. In at least some embodiments, all or a portion of a given resource, or set of resources, might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 322 of one or more types. These types can include, for example, application servers operable to process instructions provided by a user or database servers operable to process data stored in one or more data stores 324 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a portion of the resources 322 can be allocated in response to receiving a request to an interface layer 312 of the resource environment 310. The interface layer can include application programming interfaces (APIs) or other exposed interfaces enabling a user to submit requests to the service provider environment. The interface layer 312 in this example can also include other components as well, such as at least one Web server, routing components, load balancers, and the like. When a request to provision a resource is received to the interface layer 312, information for the request can be directed to a resource manager or other such system, service, or component configured to manage user accounts and information, resource provisioning and usage, and other such aspects. A resource manager receiving the request can perform tasks such as to authenticate an identity of the user submitting the request, as well as to determine whether that user has an existing account with the resource provider, where the account data may be stored in at least one data store in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider, a key management service, a corporate entity, a certificate authority, an identify broker such as a SAML provider, and the like. In some embodiments, a user can provide information useful in obtaining the credentials, such as user identity, account information, password, user-specific cryptographic key, customer number, and the like. The identity provider can provide the credentials to the resource provider environment and/or to a client device, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device to communicate with an allocated resource without having to communicate with the resource manager, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys certificates issued as well as the user to which they were issued. Some regulations require stringent security and management of cryptographic keys which must be subject to audit or other such review. For cryptographic key pairs where both public and private verification parameters are generated, a user may be granted access to a public key while private keys are kept secure within the management service. A key management service can manage various security aspects, as may include authentication of users, generation of the keys, secure key exchange, and key management, among other such tasks.

A resource manager (or another such system or service) can also function as a virtual layer of hardware and software components that handles control functions in addition to management actions, as may include provisioning, scaling, replication, etc. The resource manager can utilize dedicated APIs in the interface layer 312, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 312 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

In this example, at least some of the resources are used to support platforms and services useful in the development and providing of electronic gaming and three-dimensional graphical content, among other such options. For example, the artist machines 302 and developer machines 304 can collaborate via a game development service 314, which can be provided by a set of resources in the resource environment 310 that are able to scale dynamically as discussed above. It should be understood that artists fall within the group of people referred to herein as "developers," and that the distinction in this figure is to illustrate different types of users and purposes. Unless otherwise specifically stated, developers can include not only code developers, but also artists, game designers, engineers, quality assurance personnel, content creators, musicians, and the like. The game development service can perform tasks such as to enable the checking out or locking of items for a game, the management of game files amongst developers, the providing of tools or templates to use for gaming development, and the like. The development service can also provide communication services such as messaging and content sharing, among other such options. The game development service can store information for a game to at least one game repository 328, where the repositories can include graphics files, code, audio files, and the like. The game development service 314 can also work with an account manager, or at least maintain information in an account data store 326, such that the game development service can determine which resources, including amounts or types of resources, can be allocated on a customer's behalf for the development of one or more customer games or other such content. The account data can also specify which users are authorized to work on the gaming content, including types of content accessible, actions able to be taken, and the like.

Once the game development reaches an appropriate stage in the development cycle or pipeline, as may relate to alpha or beta testing, actual release or updating, etc., the appropriate content can be made accessible to a game publisher service 316. The game publisher service 316 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines 304 or otherwise. In some embodiments the game content might be published and made available to one or more test machines 308, which may be associated with the customer, such that the customer can test various builds or versions of the game. In some embodiments feedback provided by the test machines 308 may be provided to the game development service 314, which can maintain testing feedback or data and make that feedback available, via logs, messages, reports, or other such mechanisms, to the developers or other persons associated with the game development. If the game is to be made available to end users, gamers, or other such persons or entities, the game publisher service might publish the game content to an array of gaming servers 318 which can run the game and enable player machines 334 to access the game content over one or more networks 332, which may be different from the network(s) 306 used for game development. This can include, for example, dedicated gaming networks, the Internet, cellular networks, and the like. The player machines 334 can communicate with the appropriate interfaces of an interface layer 320 to obtain the gaming content. In some embodiments the player machines 332 will download the gaming content for execution on the individual machines, and will upload (or otherwise communicate) gaming data, messages, and other information to the gaming servers 318, as well as to other players, social networking sites, or other such recipients. The gaming servers 318 can cause state information for the various instances of the game to be stored to at least one game state repository. This can hold state for the game as a whole or for individual game sessions, among other such options. In some embodiments the game content can be executed by the game servers and streamed in near real time to the player machines 334. In some embodiments there may alternatively be a mix of gaming content executed on the player machines and the gaming servers. Peer to peer connections among the player machines and other communications can be utilized as well in various embodiments.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances on a task or event basis to execute a function. A resource instance can be allocated to run a function in response to a customer request or event, and once the function has completed that instance can either be made available for processing a different event or destroyed, among other such options. In either case, the customer will not be charged for more processing by the instance than was needed to run the function.

Figure 4:
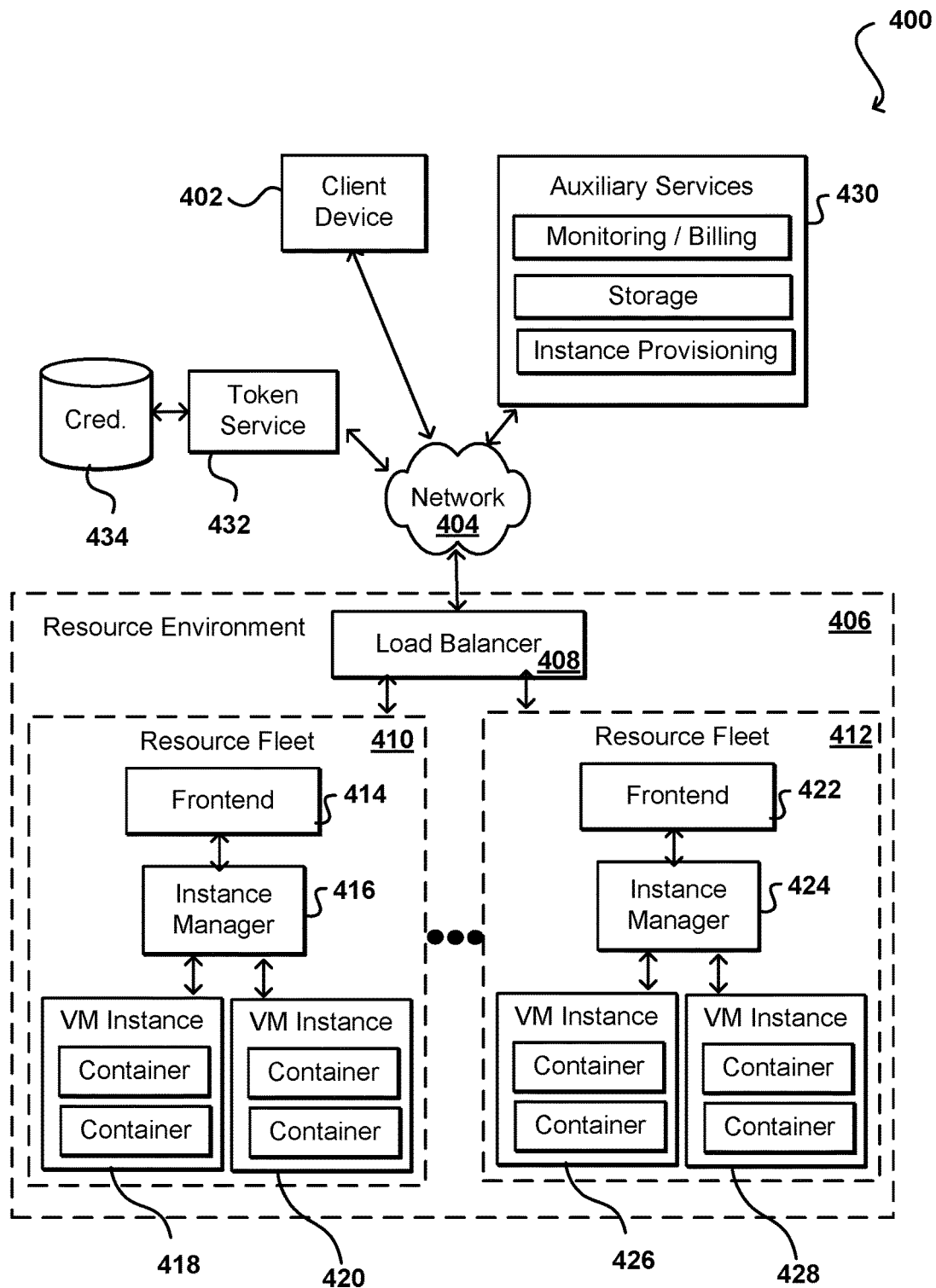
FIG. 4 illustrates an example resource environment for providing task-based resource allocation that can be used in accordance with various embodiments.

FIG. 4 illustrates components of an example environment 400 that can be used to implement such functionality. The functionality can be offered as a service, such as a Web service, in at least some embodiments, wherein a client device 402 associated with a customer can submit requests or event information over at least one network 404 to the resource environment (i.e., a resource provider environment, service provider environment, or other shared resource or multi-tenant environment). The events or requests can each be associated with specific code to be executed in the resource environment. This code can be registered with the system, and will be referred to herein as a registered function, which can be owned by a respective customer or available for use by multiple customers, among other such options. The compute service offered by the resource environment can be referred to as a "serverless" compute service that can allocate virtual resources to execute registered functions in response to customer events and automatically manage the underlying compute resources. The functions can be executed on high-availability compute infrastructure that can perform the administration of the compute resources, including server and operating system maintenance, capacity provisioning and automatic scaling, code and security patch deployment, and code monitoring and logging. Customers supply the code to be executed and can be billed based on the actual amount of compute time utilized on behalf of those customers.

In some embodiments, a registered function can include the customer code as well as associated configuration information. The configuration information can include, for example, the function name and resource requirements. Registered functions can be considered to be "stateless," in that they do not rely on state contained in the infrastructure and considered to be lacking affinity to the underlying infrastructure (e.g., the functions are not installed or otherwise tied to the operating system running in the virtual machine), so that the resource managers can rapidly launch as many copies of the function as is needed to scale to the rate of incoming events. A customer providing the code for a function can specify various configuration parameters, such as the memory, timeout period, and access rules, among other such aspects. The customer in some embodiments can also specify resources that are able to trigger execution of a registered function by a resource instance. These resources can include, for example, data buckets, database tables, or data streams, among other such options. The resource manager can invoke the code only when needed and automatically scale to support the rate of incoming requests without requiring configuration or management on behalf of the customer. A function can be executed by an allocated resource instance within milliseconds of an event in at least some embodiments, and since the service scales automatically the performance will remain consistently high as the frequency of events increases. Further, since the code is stateless the service can initialize as many resource instances as needed without lengthy deployment and configuration delays.

Routing information for customer requests or events to execute on a virtual compute fleet (e.g., a group of virtual machine instances that may be used to service such requests) based on the frequency of execution of the user code enables high frequency user code to achieve high distribution, which can be good for fault tolerance, and enables low frequency user code to achieve high consolidation, which can be good for cost reduction.

An environment such as that described with respect to FIG. 4 can facilitate the handling of requests to execute user code on a virtual compute fleet by utilizing the containers created on the virtual machine instances as compute capacity. Information for a request or event can be received to a load balancer 408 that can determine an appropriate resource fleet 410, 412 to which to direct the information. As will be discussed in more detail later herein, the decision can be based upon various types of information, as may include the context associated with the type of event or request. Upon receiving a request to execute user code on a selected virtual compute fleet 410, 412, a frontend service 414, 422 associated with the virtual compute fleet can provide the information to an instance manager, which can direct the information to a virtual machine (VM) instance 418, 420, 426, 428 where a container on the instance can provide an execution environment for the registered function.

The client device 402 may utilize one or more user interfaces, command-line interfaces (CLIs), application programming interfaces (APIs), and/or other programmatic interfaces for generating and uploading customer code, invoking the customer code (e.g., submitting a request to execute the code on the virtual compute system), scheduling event-based jobs or timed jobs, tracking the customer code, and/or viewing other logging or monitoring information related to their requests and/or customer code. Although one or more embodiments may be described herein as using a user interface, it should be appreciated that such embodiments may, additionally or alternatively, use any CLIs, APIs, or other programmatic interfaces.

In the example of FIG. 4, the resource environment 406 is illustrated as being connected to at least one network 404. In some embodiments, any of the components within the recourse environment can communicate with other components (e.g., client computing devices 402 and auxiliary services 430, which may include monitoring/logging/billing services, storage service, an instance provisioning service, and/or other services that may communicate with components or services of the resource environment 406. In other embodiments, only certain components such as the load balancer 408 and/or the frontends 414, 422 may be connected to the network 404, and other components of the virtual resource service (i.e., components of the resource fleets) may communicate with other components of the resource environment 406 via the load balancer 408 and/or the frontends 414, 422.

Customer may use the resource fleets 410, 412 to execute user code thereon. For example, a customer may wish to run a piece of code in connection with a web or mobile application that the customer has developed. One way of running the code would be to acquire virtual machine instances from service providers who provide infrastructure as a service, configure the virtual machine instances to suit the customer's needs, and use the configured virtual machine instances to run the code. Alternatively, the customer may send the resource service a code execution request. The resource service can handle the acquisition and configuration of compute capacity (e.g., containers, instances, etc., which are described in greater detail below) based on the code execution request, and execute the code using the compute capacity. The allocation may automatically scale up and down based on the volume, thereby relieving the customer from the burden of having to worry about over-utilization (e.g., acquiring too little computing resources and suffering performance issues) or under-utilization (e.g., acquiring more computing resources than necessary to run the codes, and thus overpaying).

In the configuration depicted in FIG. 4, a first resource fleet 410 includes a frontend 414, an instance manager 416 (also referred to herein as a task manager), and virtual machine instances 418, 420. Similarly, other resource fleets 412 can also include a frontend 422, an instance manager 424, and virtual machine instances 426, 428, and there can be any appropriate number of resource fleets and any appropriate number of instances in each resource fleet. The environment can include low and high frequency fleets as well in at least some embodiments, as may serve different types of requests or requests for different types of customers. The fleets can also include any number of task managers, and in some embodiments the frontend and the task manager can be resident on a single virtual machine instance.

In some embodiments, the load balancer 408 serves as a front door to all the other services provided by the virtual compute system. The load balancer 408 processes requests to execute user code on the virtual compute system and handles the first level of load balancing across the frontends 414, 422. For example, the load balancer 408 may distribute the requests among the frontends 414, 422 (e.g., based on the individual capacity of the frontends). The requests can be distributed evenly across the frontends or distributed based on the available capacity on the respective fleets, among other such options.

Customer code as used herein may refer to any program code (e.g., a program, routine, subroutine, thread, etc.) written in a program language. Such customer code may be executed to achieve a specific task, for example, in connection with a particular web application or mobile application developed by the user. For example, the customer code may be written in JavaScript (node.js), Java, Python, and/or Ruby. The request may include the customer code (or the location thereof) and one or more arguments to be used for executing the customer code. For example, the customer may provide the customer code along with the request to execute the customer code. In another example, the request may identify a previously uploaded program code (e.g., using the API for uploading the code) by its name or its unique ID. In yet another example, the code may be included in the request as well as uploaded in a separate location (e.g., the external storage service or a storage system internal to the resource environment 406) prior to the request is received by the load balancer 408. The virtual compute system may vary its code execution strategy based on where the code is available at the time the request is processed.

In some embodiments, the frontend 414 for a fleet can determine that the requests are properly authorized. For example, the frontend 414 may determine whether the user associated with the request is authorized to access the customer code specified in the request. The frontend 414 may receive the request to execute such customer code in response to Hypertext Transfer Protocol Secure (HTTPS) requests from a customer, or user associated with that customer. Also, any information (e.g., headers and parameters) included in the HTTPS request may also be processed and utilized when executing the customer code. As discussed above, any other protocols, including, for example, HTTP, MQTT, and CoAP, may be used to transfer the message containing the code execution request to the frontend 414. The frontend 414 may also receive the request to execute such customer code when an event is detected, such as an event that the customer has registered to trigger automatic request generation. For example, the customer may have registered the customer code with an auxiliary service 430 and specified that whenever a particular event occurs (e.g., a new file is uploaded), the request to execute the customer code is sent to the frontend 414. Alternatively, the customer may have registered a timed job (e.g., execute the user code every 24 hours). In such an example, when the scheduled time arrives for the timed job, the request to execute the customer code may be sent to the frontend 414. In yet another example, the frontend 414 may have a queue of incoming code execution requests, and when the batch job for a customer is removed from the virtual compute system's work queue, the frontend 414 may process the customer request. In yet another example, the request may originate from another component within the resource environment 406 or other servers or services not illustrated in FIG. 4.

A customer request may specify one or more third-party libraries (including native libraries) to be used along with the customer code. In one embodiment, the customer request is a ZIP file containing the customer code and any libraries (and/or identifications of storage locations thereof) that are to be used in connection with executing the customer code. In some embodiments, the customer request includes metadata that indicates the program code to be executed, the language in which the program code is written, the customer associated with the request, and/or the computing resources (e.g., memory, etc.) to be reserved for executing the program code. For example, the program code may be provided with the request, previously uploaded by the customer, provided by the virtual compute system (e.g., standard routines), and/or provided by third parties. In some embodiments, such resource-level constraints (e.g., how much memory is to be allocated for executing a particular user code) are specified for the particular customer code, and may not vary over each execution of the customer code. In such cases, the virtual compute system may have access to such resource-level constraints before each individual request is received, and the individual requests may not specify such resource-level constraints. In some embodiments, the customer request may specify other constraints such as permission data that indicates what kind of permissions that the request has to execute the user code. Such permission data may be used by the virtual compute system to access private resources (e.g., on a private network).

In some embodiments, the customer request may specify the behavior that should be adopted for handling the customer request. In such embodiments, the customer request may include an indicator for enabling one or more execution modes in which the customer code associated with the customer request is to be executed. For example, the request may include a flag or a header for indicating whether the customer code should be executed in a debug mode in which the debugging and/or logging output that may be generated in connection with the execution of the customer code is provided back to the customer (e.g., via a console user interface). In such an example, the virtual compute system 110 may inspect the request and look for the flag or the header, and if it is present, the virtual compute system may modify the behavior (e.g., logging facilities) of the container in which the customer code is executed, and cause the output data to be provided back to the customer. In some embodiments, the behavior/mode indicators are added to the request by the user interface provided to the customer by the virtual compute system. Other features such as source code profiling, remote debugging, etc. may also be enabled or disabled based on the indication provided in the request.

The frontend 414 can receive requests to execute customer code on the virtual compute system that have been processed by the load balancer 408. The frontend 414 can request the instance manager 416 associated with the frontend 414 of the particular fleet 410 to find compute capacity in one of the virtual machine instances 418, 420 managed by the instance manager 416. The frontend 414 may include a usage data manager for determining the usage status (e.g., indicating how frequently the user code is executed) of a particular customer code, and a customer code execution manager for facilitating the execution of customer code on one of the virtual machine instances managed by the task manager. The instance manager 416 manages the virtual machine instances in the respective fleet. After a request has been successfully processed by the load balancer 408 and the frontend 414, the instance manager 416 finds capacity to service the request to execute customer code on the virtual compute system. For example, if there exists a container on a particular virtual machine instance that has the user code loaded thereon, the instance manager 416 may assign the container to the request and cause the request to be executed in the container. Alternatively, if the customer code is available in the local cache of one of the virtual machine instances, the instance manager 416 may create a new container on such an instance, assign the container to the request, and cause the customer code to be loaded and executed in the container. Otherwise, the instance manager 416 may assign a new virtual machine instance to the customer associated with the request from the pool of pre-initialized and pre-configured virtual machine instances, download the customer code onto a container created on the virtual machine instance, and cause the customer code to be executed in the container.

In some embodiments, the virtual compute system is adapted to begin execution of the customer code shortly after it is received (e.g., by the load balancer 408 or frontend 414). A time period can be determined as the difference in time between initiating execution of the customer code (e.g., in a container on a virtual machine instance associated with the customer) and receiving a request to execute the customer code (e.g., received by a frontend). The virtual compute system can be adapted to begin execution of the customer code within a time period that is less than a predetermined duration. The customer code may be downloaded from an auxiliary service 430. The data may comprise user code uploaded by one or more customers, metadata associated with such customer code, or any other data utilized by the virtual compute system to perform one or more techniques described herein. Although only the storage service is illustrated in the example of FIG. 4, the resource environment 406 may include other levels of storage systems from which the customer code may be downloaded. For example, each instance may have one or more storage systems either physically (e.g., a local storage resident on the physical computing system on which the instance is running) or logically (e.g., a network-attached storage system in network communication with the instance and provided within or outside of the virtual compute system) associated with the instance on which the container is created. Alternatively, the code may be downloaded from a web-based data store provided by the storage service.

In some embodiments, once a virtual machine instance has been assigned to a particular customer, the same virtual machine instance cannot be used to service requests of any other customer. This provides security benefits to customers by preventing possible co-mingling of user resources. Alternatively, in some embodiments, multiple containers belonging to different customers (or assigned to requests associated with different customers) may co-exist on a single virtual machine instance. Such an approach may improve utilization of the available compute capacity. Although the virtual machine instances are described here as being assigned to a particular customer, in some embodiments the instances may be assigned to a group of customers, such that an instance is tied to the group of customers and any member of the group can utilize resources on the instance. For example, the customers in the same group may belong to the same security group (e.g., based on their security credentials) such that executing one member's code in a container on a particular instance after another member's code has been executed in another container on the same instance does not pose security risks. Similarly, the instance manager 416 may assign the instances and the containers according to one or more policies that dictate which requests can be executed in which containers and which instances can be assigned to which customers. An example policy may specify that instances are assigned to collections of customers who share the same account (e.g., account for accessing the services provided by the virtual compute system). In some embodiments, the requests associated with the same customer group may share the same containers (e.g., if the customer code associated therewith are identical). In some embodiments, a request does not differentiate between the different customers of the group and simply indicates the group to which the customers associated with the requests belong. In some embodiments, the virtual compute system may maintain a separate cache in which customer code is stored to serve as an intermediate level of caching system between the local cache of the virtual machine instances and a web-based network storage (e.g., accessible via the network 140).

The instance manager 416 may also manage creation, preparation, and configuration of containers within virtual machine instances. Containers can be logical units within a virtual machine instance and utilize resources of the virtual machine instances to execute customer code. Based on configuration information associated with a request to execute customer code, such a container manager can create containers inside a virtual machine instance. In one embodiment, such containers are implemented as Linux containers.

After the customer code has been executed, the instance manager 416 may tear down the container used to execute the user code to free up the resources it occupied to be used for other containers in the instance. Alternatively, the instance manager 416 may keep the container running to use it to service additional requests from the same customer. For example, if another request associated with the same customer code that has already been loaded in the container, the request can be assigned to the same container, thereby eliminating the delay associated with creating a new container and loading the customer code in the container. In some embodiments, the instance manager 416 may tear down the instance in which the container used to execute the customer code was created. Alternatively, the instance manager 416 may keep the instance running to use the instance to service additional requests from the same customer. The determination of whether to keep the container and/or the instance running after the user code is done executing may be based on a threshold time, the type of the user, average request volume of the user, and/or other operating conditions.

In some embodiments, the virtual compute system may provide data to one or more of the auxiliary services 430 as the system services incoming code execution requests. For example, the virtual compute system may communicate with the monitoring/logging/billing services, which may include: a monitoring service for managing monitoring information received from the virtual compute system, such as statuses of containers and instances on the virtual compute system; a logging service for managing logging information received from the virtual compute system, such as activities performed by containers and instances on the virtual compute system; and a billing service for generating billing information associated with executing customer code on the virtual compute system (e.g., based on the monitoring information and/or the logging information managed by the monitoring service and the logging service). In addition to the system-level activities that may be performed by the monitoring/logging/billing services (e.g., on behalf of the virtual compute system) as described above, the monitoring/logging/billing services may provide application-level services on behalf of the customer code executed on the virtual compute system. For example, the monitoring/logging/billing services may monitor and/or log various inputs, outputs, or other data and parameters on behalf of the customer code being executed on the virtual compute system. Although shown as a single block, the monitoring, logging, and billing services may be provided as separate services.

In some embodiments, the instance manager 416 may perform health checks on the instances and containers managed by the instance manager (e.g., an "active pool" of virtual machine instances managed by the instance manager and currently assigned to one or more customers). For example, the health checks performed by the instance manager 416 may include determining whether the instances and the containers managed by the instance manager have any issues of (1) misconfigured networking and/or startup configuration, (2) exhausted memory, (3) corrupted file system, (4) incompatible kernel, and/or any other problems that may impair the performance of the instances and the containers. In one embodiment, the instance manager 416 performs the health checks periodically. In some embodiments, the frequency of the health checks may be adjusted automatically based on the result of the health checks. In other embodiments, the frequency of the health checks may be adjusted based on customer requests. In some embodiments, the instance manager 416 may perform similar health checks on the instances and/or containers in the pool of pre-warmed virtual machine instances that are not yet assigned to any customer but ready to service incoming requests. The instances and/or the containers in such a warming pool may be managed either together with those instances and containers in the active pool or separately. In some embodiments, in the case where the health of the instances and/or the containers in the warming pool is managed separately from the active pool, a separate warming pool manager that manages the warming pool may perform the health checks described above on the instances and/or the containers in the warming pool.

The virtual machine instances can be logical in nature and implemented by a single or multiple physical computing devices. At least some of the virtual machine instances may be provisioned to provide a variety of different desired conditions depending on the needs of the user. Examples of the types of desired conditions include, but are not limited to: particular operating systems, particular language runtimes, and particular libraries that may be utilized by the user code. Additionally, one or more virtual machine instances may be provisioned generically when a desired operating condition is not specified or is otherwise not available. One skilled in the relevant art will appreciate that the virtual compute system is logical in nature and can encompass physical computing devices from various geographic regions.

The frontend 414, 422 can route code-processing requests according to a method that is different than the method used by the load balancer 408 to route requests among the frontends. For example, a frontend 414 can route the requests to the specific instance manager based on the customer code and/or based on the customer associated with the customer code. In some embodiments, the routing is determined based on a consistent-hashing scheme in which one or more parameters associated with the request (e.g., customer ID, customer code ID, etc.) are hashed according to a hash function and the request is sent to one of the instance managers that has previously been assigned to the sections of a hash ring (e.g., containing a plurality of hash values) that corresponds to the resulting hash value. For example, the instance managers can occupy one or more sections of the hash ring, and the requests can be mapped to those same hash values. In some embodiments, the hash values may be integer values, and each instance manager may be associated with one or more integer values. The one or more integer values associated with a particular instance manager may be determined based on one or more parameters associated with the instance manager (e.g., IP address, instance ID, etc.). In some embodiments, the request may be sent to the instance manager whose associated integer values are closest to, but not larger than, the hash value calculated for that request (e.g., using modulo arithmetic).

When the frontends determine that one or more instance managers have become unavailable, the frontends can associate the hash values previously associated with the one or more instance managers that have become unavailable with one or more available instance managers in another fleet.

Similarly, when a new instance manager is added to a fleet, the new instance manager may take a share of the hash values associated with the existing instance managers. For example, the new instance manager may be assigned one or more sections of the hash ring that were previously assigned to the existing instance managers.

As mentioned, resource capacity can be allocated as needed to execute code or perform specific tasks, which can be allocated in response to various events. The events can include any appropriate types of events, as may be permitted by a service provider or allowed through various rules or policies, among other such options. These can include, for example, modifications to data buckets or updates to data tables, among other such options. The dynamic allocation of such capacity enables service owners to get out of the business of provisioning and managing the underlying hardware for executing code. For flexibility and efficiency in resource management, such a platform or service might not make any guarantees with respect to reusing the same containers or resource instances for running a specific instance of code, such as a registered function, for all incoming requests.

As mentioned, in order to process various types of events a resource instance for a registered function may require access to various other resources, data sources, or other relevant systems or functionality in (or outside) a resource allocation environment. In some embodiments, a function can be configured with a specified role or identity, which will have various associated permissions and privileges. A registered function can be associated with a determined role, and when a resource instance is allocated for the registered function, the resource instance can be provided with an access token, or other appropriate security credential, which can provide the access needed for that function. As illustrated in the example 400 of FIG. 4, the token can be provided by a token service 432, which can be internal or external to the resource environment 406, and may managed by the resource provider or a third party in various embodiments. The token service can store information about various types of roles and access in a credential repository 434, or other appropriate location, and in response to a request for an access token for a registered function, can determine the appropriate role and permissions and provide a corresponding access token to be provided to the allocated resource instance. The frontend 414 or instance manager 416 for a relevant resource fleet 410 can cause the configured role to be bound to the relevant host(s) when an instance of a registered function is created on that host. The role can be bound as an instance profile or other such mechanism. Once the role is bound, the resource instance can assume the bound identity for accessing various resources or dependencies, as may include various data sources, internal or external resource, or network functionality, among other such options. The resource instance can thus obtain the temporary credentials needed to execute the registered function and process the event.

Using such an identity management model, the function instances triggered by any event could thus have access to credentials with the same privileges. For example, a registered function can have input access to a specified data bucket specified in the triggering event and write access to a corresponding database table. The assigned identity role for this function could then allow any function instance to read from any available bucket from that data source and write into any available table in the relevant database. A vulnerability present in the registered lambda function (i.e., an extensible markup language (XML) external entity resolution) could allow a producer of an event to hijack the credentials for the registered function, such as by using an XML external entity attack and retrieving the credentials from a local metadata endpoint for the data source. The security breach might then spread across the buckets of all function owners as well as all available tables in the database.

Accordingly, approaches in accordance with various embodiments attempt to enhance security and limit the impact of any vulnerabilities by creating and delivering temporary credentials for each event, or type of event, that can act as a trigger for a registered function. While the registered function might be associated with a role having a broader set of permissions, the temporary credentials derived therefrom can have privileges restricted to those required to process the triggering event. A function owner can define one or more parameterized access policies for his or her registered function(s) that can be based at least in part upon the types of triggering events for that registered function. The resource allocation service can use these parameterized access policies to generate policy instances corresponding to each event, and use the policy instances for creating and delivering the temporary credentials with each event.

Figure 5:
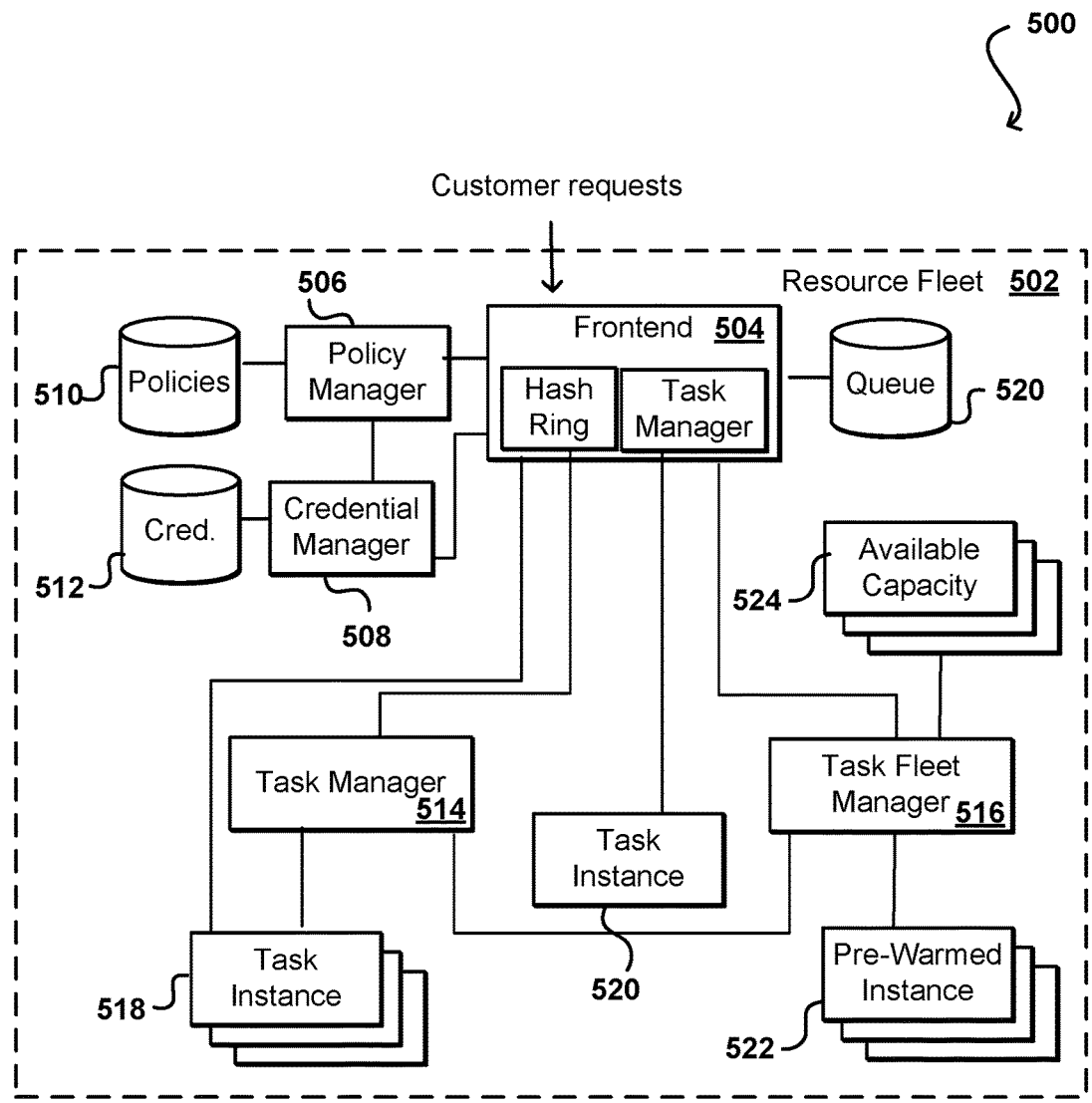
FIG. 5 illustrates an example resource fleet that can be utilized in accordance with various embodiments.

FIG. 5 illustrates an example environment 500 that can be used to implement at least some of this functionality. In this example, information for customer requests or events can be directed to a resource fleet 502. The information can be directed using a load balancer and/or interface layer as discussed previously as part of a resource allocation environment. In this example the resource instances will be referred to as "tasks," which in various embodiments can refer to the virtual machine instances 418, 420, 426, 428 described with respect to FIG. 4. It should be understood, however, that various other types of resource instances can be utilized as tasks as well within the scope of the various embodiments.

As described, the frontend 504 may receive an event notification, customer request, or other event information that indicates an event has occurred for which a registered function should be utilized or processing. In this example, the frontend 504 can determine the appropriate registered function and place the event information in an event queue 520. In other embodiments the event information might be placed into the event queue before determining the registered function, or the event information might specify the registered function, among other such options. Further, in this event the frontend 504 and/or a task manager of the frontend can place the event information in the event queue 520, while in other embodiments other task managers 514, 516 might receive the information and place the information in the same, or a different queue, among other such options. The frontend, task manager, or a separate queue manager can determine that a task instance 518, 520 is now available to process the event information using the respective registered function. This can include, for example, determining that a new instance should be initialized to process the event as well as allocating an existing instance, etc. The respective task manager 514 can then allocate the relevant task instance 518 for the event, pull the event information from the event queue 520, and provide the information to the allocated task instance 518 for processing using the registered function. As mentioned, the task instance can be a newly allocated task instance or can utilize a pre-warmed instance 522 that has been allocated and configured to perform an initial set of tasks for a gaming application. The pre-warmed instances 522 can be used for task instances 518 or placed back into available capacity 524, among other such options discussed and suggested herein.

At some subsequent point, the allocated task instance 518 will complete processing for the event. This can occur for a number of different reasons as discussed elsewhere herein. The allocated instance can return a result of the processing that can be received back to the task manager 514 and/or the frontend 504. In some embodiments the result will go to the task manager, so the manager knows the instance is available for processing another event, and then can go to the frontend, so the frontend can provide any appropriate response or take another appropriate action.

In order to process the event, a task instance 518 can be allocated for the relevant registered function. As mentioned, the task will need to obtain the appropriate access credential(s) for the registered function, as may be determined by a role bound to that instance for the registered function. As mentioned, the role can provide various types of access for a determined period of time, such as fifteen minutes in some embodiments, although other lengths of time can be specified as well. Since there can be various types of triggering events for a function, the role can enable access to all relevant data for any of those events for the entire lifecycle of the function. As mentioned, however, granting all the access provided under the role can enable any vulnerability in the registered function to access data outside the scope of the registered function, and potentially exfiltrate the credentials outside of the function for various other purposes. As an example, various parsers might be used to ingest and process different types of documents, and without a security review of those parsers there is potential that parsing of an untrusted document could expose access to the function credentials.

Accordingly, approaches in accordance with various embodiments can provide event-specific credentials that are derived from an identity role bound, or otherwise associated, to the registered function for a resource instance. The necessary privileges can be provided under the role, but the restricted credentials can prevent access outside that needed to process the event. A system, component, or service such as a credential manager 508 can create a temporary token that has access only to those input and output sources required for processing the event, and can cause that token to be passed to the relevant task 518 allocated for the event. The event-specific credential can be bound to the resource instance allocated in response to a specific event, and the permissions granted under the temporary credential determined based upon the specific event. The credential manager 508 can generate a temporary token that is event-specific, and can cause that temporary token to also be stored to a credential repository 512 or other appropriate cache such that the credentials can be passed to any other resource instance allocated for a registered function in response to the same type of event.

The event-specific credential can be generated according to the security token bound to the registered function and received from the token service in at least some embodiments. In order to determine which subset of permissions to be granted from the token, a function owner can define one or more relevant access policies that can be stored to a relevant policy data store 510 or other accessible location. A policy manager 506, or other such system or service, can work with the credential manager 508 to determine the appropriate policy for an event, which the credential manager 508 can then use to determine the appropriate permissions and generate the temporary credential to be provided to the allocated task 518. The policy manager in some embodiments can maintain a mapping between the policies and events, in order to derive the appropriate temporary credentials from the function role. It should be understood that in at least some embodiments the policy manager 506 and/or credential manager 508 could be implemented in the frontend 504, an event router, or another such component discussed or suggested herein.

In at least some embodiments a function owner can provide a template policy which includes variables whose values will be specific to an event. This can include, for example, identifiers for the input and output data sources to which access can be granted, as well as the type of access and other such information. For each event, the available access for the relevant role can be determined, and the variable values for the event inserted into the template policy. The policy manager can then ensure that the permissions per the policy are contained within the overall permissions of the role, and if so can generate the temporary credential to be provided to the allocated task. In some embodiments the credential manager can generate the event-specific credentials, while in other embodiments the credential manager can submit a request to the token service to receive an event-specific token, among other such options. As mentioned, the credential manager 508 can cache a received event-specific token in a local credential cache 512 to be used for other similar events for the registered function over the lifetime of the temporary credential.

In some embodiments the frontend 504 or task manager 514 will perform a lookup to determine the relevant role for a function before performing the task allocation. The frontend or task manager can also, directly or via a policy manager 506, determine the appropriate template policy mapped to the specific event. The frontend or task manager can then, directly or via the credential manager, begin filling in the template using the event-specific values. As an example, a registered function might be triggered by a notification event on a storage service, and the event can be received from any bucket on that storage service.

As mentioned, resource instances can be used to perform various tasks for customer applications, as may relate to gaming applications. This can include, for example, a resource instance such as a virtual machine functioning as a game server for a gaming session involving multiple players. Various cloud providers allocate a significant amount of dedicated computing resources, such as physical servers and virtual servers, to hosting game servers for online gaming. Often this involves the dedicated allocation of a physical server, or portion of a physical server, for a determined period of time, such that the server is able to host multiple gaming sessions over that period while allocated to the customer. As mentioned, a downside to such an approach is that the server is allocated to the customer whether the customer is actively using the server or not. Since the customer is paying for the allocation, it is up to the customer or game provider to maximize usage of the server in order to minimize costs and underutilized resources. This can be difficult for various providers, and in some cases can cause the game providers to purchase fewer servers, which can result in some unavailability when the servers are running at capacity, which can result in a poor player experience.

Accordingly, approaches in accordance with various embodiments can attempt to provide resources on an as-needed basis, so that customers only pay for the resources they are actually utilizing and are not responsible for maximizing usage of the resources. This can include, for example, utilizing task-based resources as discussed previously that are allocated dynamically as needed for various gaming sessions, and that are terminated or made available for other customers, sessions, or tasks after completion of the determined task. Also as mentioned, some task-based instances can be configured to perform specific tasks or types of tasks, while other task-based instances may be allocable at any time for any appropriate purpose. In addition to being able to obtain resources on an as-needed basis, various embodiments can also enable customers to obtain different amounts of capacity, such as instances with different amounts of compute, memory, or networking capacity, through changes in instance configuration. The customers may not then be aware of, or care about, the types of hardware being used, but are able to obtain the amount of resource capacity needed to perform certain game-related tasks. As mentioned, these tasks can include the allocation of a task-based instance to function as a gaming server for a gaming session, among other such options.

In the example environment of FIG. 5, a task fleet manager 516 or other such component or service can maintain a pool of available resource capacity 524. When a new gaming session is requested, such as by one or more players, the gaming client or a game manager can contact a frontend 504 or task fleet manager 516 to obtain resource capacity for the task of acting as a game server for the gaming session. As discussed elsewhere herein, the approach might wait for a player quorum or other session criterion before requesting the resource capacity. In other embodiments the request might cause a task-based instance to be allocated and the instance to start loading the game content in order to minimize the wait time for the game server to be ready to state the game for the session. In this example, the request can indicate information about the task to be performed. The request can also indicate information about the type or amount of resources needed, or can identify a task for which that information is provided. In some embodiments types of tasks might be defined with associated functions and metadata that can be allocated and/or executed in response to such a request.

Tasks relating to game servers and gaming applications can take a significant time to load, as discussed previously, such that the allocation of available capacity and initialization of a gaming session may not be optimal in at least some situations. Even after a quorum of players has signed on to a session, the long load time may still cause the players to have to wait an unacceptable amount of time to begin playing the game. Accordingly, approaches in accordance with various embodiments can attempt to "pre-warm" at least some number of task-based instances that can be utilized to provide game servers or perform other such tasks, but will require significantly less loading time than a newly provisioned resource. In at least some embodiments these can be considered as separate tasks or different stages of the same task. For example, as indicated in FIG. 5 some amount of the available capacity 524 can be allocated as pre-warmed instances 522, where the pre-warmed instances can execute what are referred to herein as "disposable tasks." A disposable task can relate to the preparation or pre-warming of a task-based instance to a determined or initial level or state, which is less than the state required for a full task. This can include, for example, loading game content and configuration information needed to operate a game server, and loading the game server up to a determined point in the load process. The pre-warming state might be determined based upon a number of factors, as may relate to the amount of information to be loaded, loading time, execution resources required, and the like. The pre-warming state should be such that if the pre-warmed instance is selected to be allocated for a game session and assigned to perform a normal task, such as to function as a game server for a game session, the remaining load time can be less than a maximum determined load time. In some embodiments the disposable task portion will be defined by the customer or game provider, while in other embodiments the disposable task portion might be determined dynamically by the resource environment utilizing information from the normal task. Various other options can be leveraged as well within the scope of the various embodiments.

In addition to a disposable task being only a portion or subset of a normal task, the disposable tasks can be treated differently by the resource managers as well. A disposable task can be considered something that can be destroyed if the capacity is needed for a higher priority request, such as to execute a normal task. Disposable tasks can be executed when unused capacity is available, but then those resources can be reclaimed as needed. This can help to both reduce overall load time while still allowing the capacity to be available as needed. A task-based instance can be flagged or otherwise designated as hosting a disposable task, then that instance can remain in a separate pool, or as part of the pool of unused capacity. If a request is subsequently received that requires unused capacity, then the available unused capacity can be provided, and if more capacity is needed then at least some of the disposable task instances can be reclaimed and used to provide additional resource capacity. In some embodiments a system may be configured to keep at least a minimum amount of unused capacity, at least under certain load conditions, and in such situations at least some of the disposable task instances can be reclaimed in order to maintain at least the minimum amount of available unused capacity. In other embodiments the disposable task instances can qualify as available unused capacity. Because disposable tasks can be implemented using spare hardware capacity, the ability to obtain usage of these tasks can be relatively inexpensive. There will be very little additional cost to the provider, relating mostly to additional electricity and a little extra processing. The benefit to the game provider can be significant, however, as game sessions will be able to load and start much more quickly. Further, while the on-demand instances might be slightly more expensive per unit capacity, there can be significant savings to the customer in that the customer only pays for the actual capacity used and does not have to purchase any excess or unused capacity.

FIGS. 6A-6D illustrate an example approach for providing pre-warmed instances for disposable tasks using unused capacity that can be utilized in accordance with various embodiments. In the example allocation 600 of FIG. 6A, two normal tasks can be executed using two game server instances 602, each of which can serve a respective multi-player game. The size and capacity of each instance can be configured based on the need for the corresponding game, such that the customer or game provider does not pay for any excess capacity. These instances 602 can have been provided using pre-warmed instances, executing disposable tasks, or newly provisioned instances as discussed elsewhere herein. In this example there are also a number of pre-warmed instances 604 available, where in some embodiments a customer might pay for up to a maximum number (or at least a minimum number) of pre-warmed instances when there is sufficient and/or a minimum amount of unused capacity available across the resource provider environment. In this example, ten pre-warmed instances 604 are created that each execute a disposable task, such as to load and execute a game server up to the point where the server is able to accept and serve player requests. Various other types of disposable tasks can be executed as well as discussed elsewhere herein.

Figure 6A:
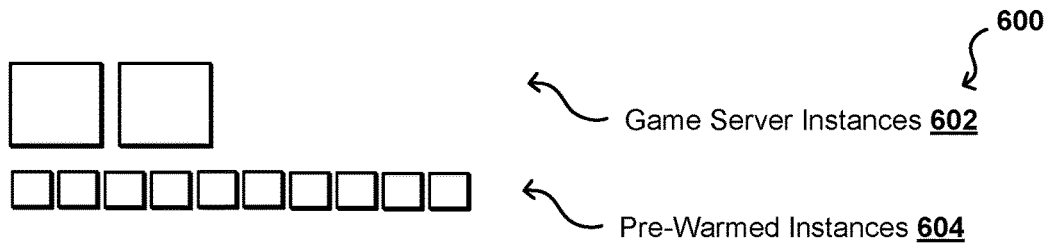
FIGS. 6A, 6B, 6C, and 6D illustrate an example approach to managing a pool of unused capacity to provide pre-warmed gaming instances that can be utilized in accordance with various embodiments.
Figure 6B:
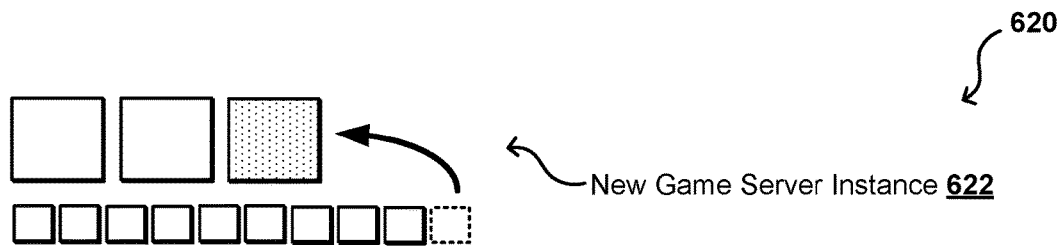

In the example allocation 620 of FIG. 6B, a player request is received for which a new game session is to be initiated. As mentioned elsewhere herein, in some embodiments the game service might wait for a quorum of players to be ready to play, while in other embodiments the game server might be allocated as soon as a request is received in order to enable the game server to load and be ready to serve requests once a quorum is reached, among other such options. In this example, there are pre-warmed instances executing disposable tasks for the game, such that when the request is received one of the pre-warmed instances can be selected and cause to execute a normal task for the game as a new game server instance 622. The partially loaded game server instance can then complete the load process to be ready to serve requests on the subsequent game session. As mentioned, if there had not been an available pre-warmed instance but available capacity then a new game server instance could have been initiated that would go straight to execution of a normal task without first executing a disposable task and then upgrading that disposable task to a normal task.

Figure 6C:
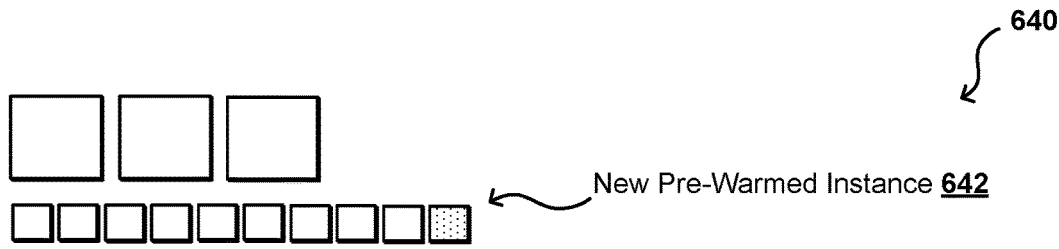

After the pre-warmed instance is converted to a full instance, a determination can be made that there is sufficient unused capacity to replace the pre-warmed instance as illustrated in the example allocation 640 of FIG. 6C. As mentioned, there can be a target or maximum number of pre-warmed instances to be allocated for a game customer, and if there is sufficient capacity then a new pre-warmed instance 642 can be allocated and configured to execute a disposable task in accordance with various embodiments. If there is insufficient available capacity, then the number of pre-warmed instances can remain at nine until such time as there is sufficient unused capacity to generate another pre-warmed instance.

Figure 6D:
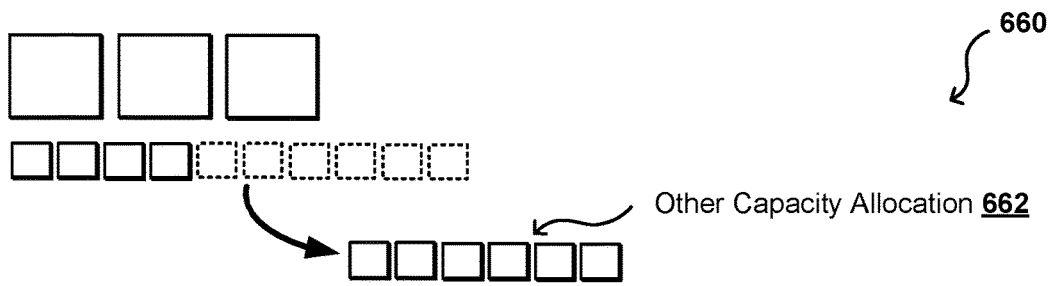

It may also be the case, however, that the amount of available unused capacity drops below a minimum or threshold amount, as in the example allocation 660 of FIG. 6D. In such a situation, at least some of the pre-warmed instances can be reclaimed in order to obtain the needed capacity. As mentioned, this can occur when capacity is needed for a normal task, or other higher priority task for which the same or a different customer may be requesting under a normal resource allocation request. In this example, a determined number of pre-warmed instances can be reclaimed in order to obtain the other capacity allocation. This can be the amount required for the other task, an amount needed to keep the available capacity at or near a target value, or the full amount of available capacity, among other such options. The process can thus make up to a determined number of pre-warmed instances available for a customer any time one or more capacity requirements are satisfied, such as may involve a minimum amount of unused capacity, a maximum workload, a maximum capacity cost, and the like.

In various embodiments, a customer can provide the appropriate information and content to enable an amount of resource capacity to function as a game server for a multi-player online game or other such offering. The game customer can provide a determined package that contains the game server executable and related content and configuration information. That package can then be stored and used to launch each instance of the game server needed for the gaming application. The customer can also provide capacity requirements such as an amount of processing capacity, amount of memory, amount of bandwidth, and other such requirements, as well as potentially information about the type of server to be allocated or other software installed, etc. In addition to receiving the amount of processing capacity needed without excess, such an approach also does away with the need to perform complex testing of a new box used to support game servers using conventional approaches. Further, if the customer decides to change the server information to cause instances to be allocated with more compute capacity or memory, the customer can just change the configuration information for the package which will then be applied to all future instances allocated for the game. And the customer can obtain an instance of their desired size and capacity at any time without the need for excess due to purchasing fixed amounts of capacities or being limited to instances of specific sizes. The task-based approach can also allow for incoming connections with its instances, and in at least some embodiments may have no requirement as to a minimum length or period of allocation, and can terminate or be reclaimed as soon as a session has completed or another termination criterion is reached. The instance can also be allocated as long as required in at least some embodiments, subject to any infinite process restrictions or other safety policies.

In some embodiments the number of pre-warmed instances to provide can be set manually, such as by the customer or provider. The number can be a target number, maximum number, or minimum number, and can be based upon one or more criteria, such as an available amount of unused capacity. The number to provide can also be determined dynamically by a resource manager or other such component or service based upon current environment conditions. The manager can determine trends or predicted usage based on historical usage data, for example, as well as current workload, time of day, number of users currently logged in, etc. The manager an also look at the number of each game map being loaded to determine the relative allocations to be provided. Information about the wait time for each game or map can also be used to determine the number of instances to pre-warm for each game. In some instances users may login before requesting to join a gaming session, so the number of logins can also be used to determine the number of instances to pre-warm at any given time. In some embodiments there may be service level agreements (SLAs) provided to the customers, and the number of pre-warmed instances allocated may also be a number sufficient to ensure meeting the SLAs, at least balanced against the cost of violating other SLAs if there is insufficient capacity available.

Figure 7:
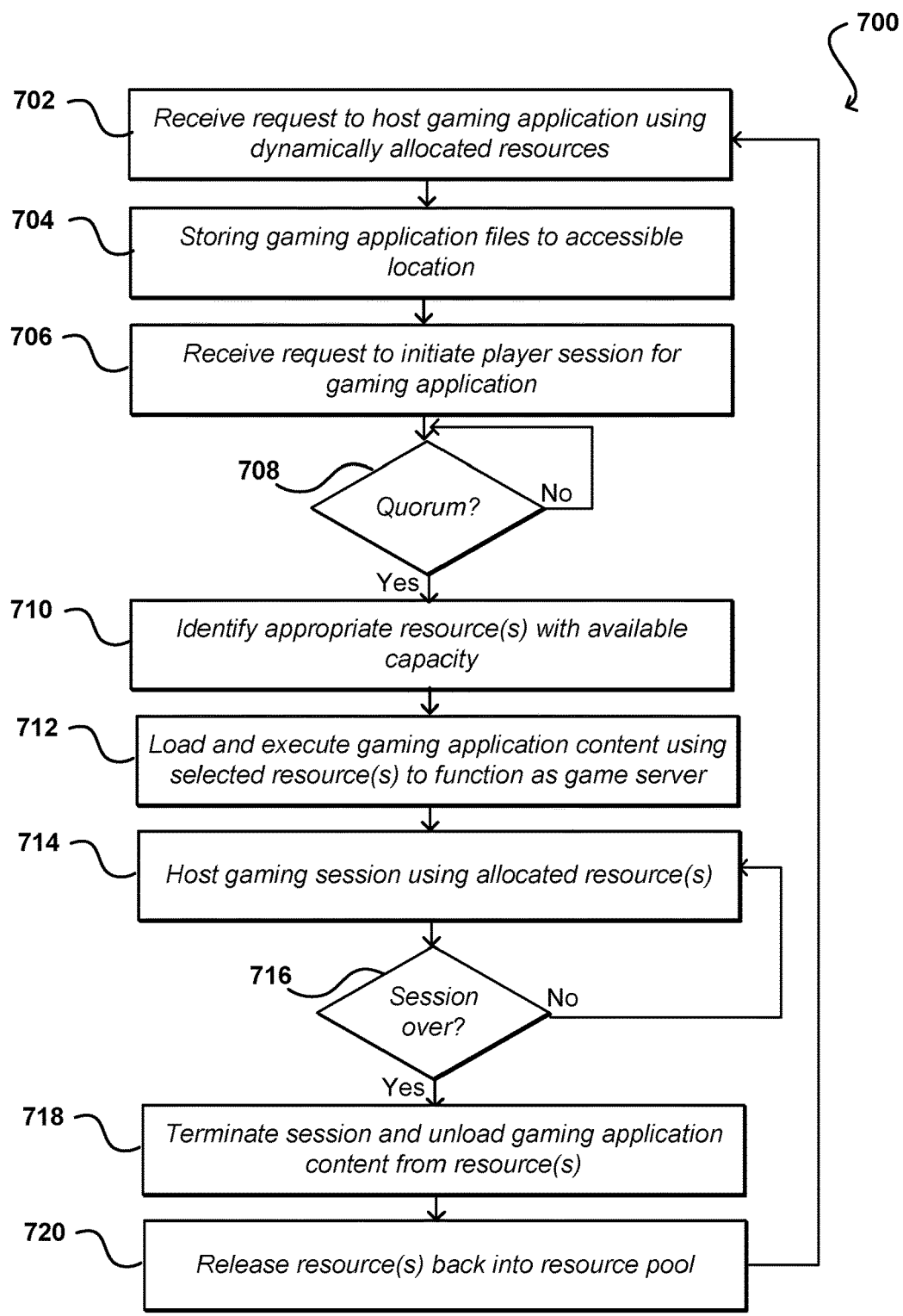
FIG. 7 illustrates an example process for managing resources allocated for a gaming session that can be utilized in accordance with various embodiments.

FIG. 7 illustrates an example process 700 for dynamically allocating resources for gaming applications that can be displayed in accordance with one embodiment. It should be understood for this and other processes discussed herein that there can be additional, alternative, or fewer steps performed in similar or alternative orders, or in parallel, within the scope of the various embodiments unless otherwise stated. Further, although gaming applications are a primary example utilized herein, it should be understood that other types of applications or content can benefit from advantages of the various embodiments as well, where the content can include animation, virtual reality or augmented reality applications, and the like. In this example, a request is received 702 to host a gaming application using dynamically allocated resources in a shared resource environment. As mentioned, this can involve allocating a specified amount of resource capacity on an as-needed basis to perform specific tasks, such as to execute a game server for a multiplayer session of the gaming application. A package or container of gaming files and configuration information can be received and stored 704 to an accessible location, wherein resources can be allocated and configured using the stored information.

Subsequently, a request can be received 706 to initiate a player session for the gaming application. This can be received from a player device or console, or an administrator console, among other such options. In this example the execution of a game server can wait until it is determined 708 there is a quorum of players for the gaming session, although in other embodiments a server can be allocated directly in response to such a request. Appropriate resource capacity is identified 710, such as may include one or more resources such as servers and storage devices having sufficient available capacity to perform the indicated task(s) for the gaming session. Once identified, the gaming application content can be loaded 712 and executed in order to enable the allocated resources to perform the identified task. As mentioned, this can include a task-based instance being allocated to perform a normal task, such as to function as a game server, in at least some embodiments. The gaming session can then be hosted 714 by the allocated resources as discussed elsewhere herein. The hosting can continue until it is determined 716 that the gaming session is over, or another termination criterion is reached. At that point, the session can be terminated 718 and the gaming content unloaded from the allocated resource(s). The resource capacity can then be released 720 or reclaimed as available capacity that can be allocated for another task, as may relate to the same customer or a different customer of the shared resource environment.

Figure 8:
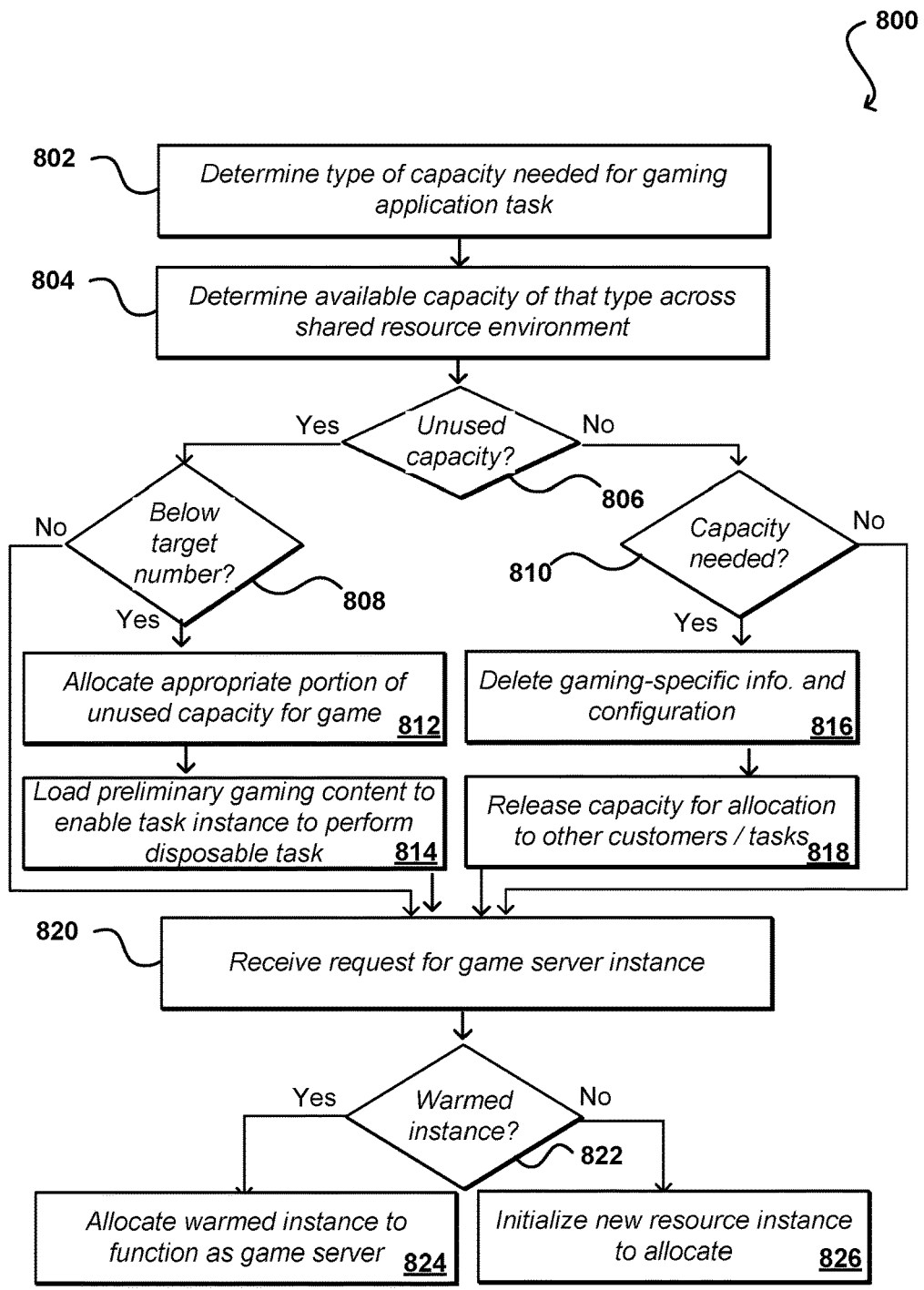
FIG. 8 illustrates an example process for managing a pool of unused capacity to provide pre-warmed gaming instances that can be utilized in accordance with various embodiments.

FIG. 8 illustrates an example process 800 for maintaining a pool of pre-warmed task-based instances that can be utilized in accordance with various embodiments. In this example, a type of capacity needed for a gaming application task is determined 802. As mentioned, in various embodiments a customer can provide configuration information with a gaming package or container provided for a particular game, although other approaches to specifying the type and/or amount of capacity can be utilized as well within the scope of the various embodiments. An amount of available capacity of that type can be determined 804 using resources across the shared resource environment. A determination can be made 806 as to whether there is unused capacity of that type, or at least an amount above a minimum warming threshold. If so, another determination can be made 808 as to whether a current number of pre-warmed instances for the particular task is below a target number (or maximum number, etc.). If the number of pre-warmed instances is below a target number then an appropriate portion of the unused capacity can be allocated 812 to be used for pre-warmed instances for the gaming application, such as may bring the number of pre-warmed instances up to the target number. Otherwise, a smaller number or amount may be allocated based upon available capacity. An amount of preliminary content can be loaded 814 and/or executed to enable each pre-warmed instance to be able to perform a disposable task, such as to be able to load and execute a gaming server up to the point where the server is able to serve player requests.

If it was instead determined that there was not a sufficient amount of unused capacity, then no additional pre-warmed instances can be allocated. Instead, another determination can be made 810 as to whether additional capacity is needed for other purposes, such as for other customer tasks. If so, the gaming-specific information can be deleted 816 and configuration removed from one or more of the existing pre-warmed instances, where available, based upon the amount of capacity needed. That capacity can then be released 818 or reclaimed back into the pool of available capacity for allocation for the other customer requests. In some embodiments the reclamation will only occur when specific tasks require the capacity, while in other embodiments the reclamation can occur when the available capacity drops below a minimum threshold, among other such options. When a request is subsequently received 820 for a game server instance, a determination can be made 822 as to whether there are any warmed instances for that game. If so, one of the pre-warmed instances can be allocated 824 to function as a game server for the gaming session. As mentioned, this can involve upgrading to a full instance executing a normal task instead of a disposable task, such as executing a game server that is operable to serve player game requests. If no warmed instances exist, but capacity allows, then a new resource instance can be initialized 826 and allocated to function as the game server. As mentioned, this may result in a long load time but may be required when a pre-warmed instance is not otherwise available.

Figure 9:
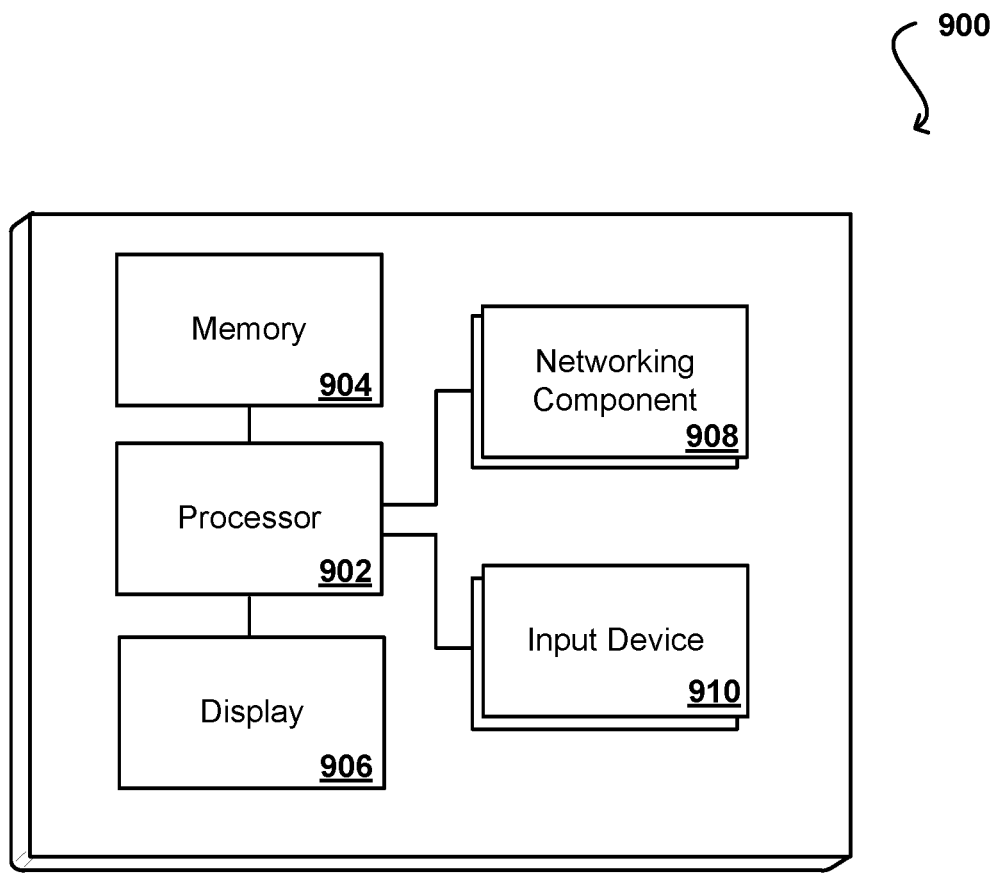
FIG. 9 illustrates example components of a computing device that can be used to implement aspects of the various embodiments.

FIG. 9 illustrates a set of basic components of an example computing device 1000 that can be utilized to implement aspects of the various embodiments. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, a removable memory can be available for sharing information with other devices, and any number of communication approaches can be available for sharing with other devices. The device may include at least one type of display element 906, such as a touch screen, electronic ink (e-ink), organic light emitting diode (OLED) or liquid crystal display (LCD), although devices such as servers might convey information via other means, such as through a system of lights and data transmissions. The device typically will include one or more networking components 908, such as a port, network interface card, or wireless transceiver that enables communication over at least one network. The device can include at least one input device 910 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or notebook computers running a standard operating system, as well as cellular, wireless and handheld devices running mobile software and capable of supporting a number of networking and messaging protocols. Devices capable of generating events or requests can also include wearable computers (e.g., smart watches or glasses), VR headsets, Internet of Things (IoT) devices, voice command recognition systems, and the like. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a request to host a gaming application using a plurality of virtual computing resources, the virtual computing resources provided using a set of physical resources of a multi-tenant environment;
   identifying an amount of unused capacity of the set of physical resources;
   launching a set of warmed virtual computing resources using at least a portion of the unused capacity;
   causing the set of warmed virtual computing resources to load an initial subset of content for the gaming application enabling the warmed virtual computing resources to perform an initial game task;
   receiving a request for a game server to host an active session for the game application; and
   causing a selected virtual computing resource, of the warmed virtual computing resources, to load a remaining subset of content for the gaming application to function as a game server for the active session.

2. The computer-implemented method of claim 1, further comprising:
   receiving a subsequent request for at least a portion of the unused capacity; and
   causing one or more of the warmed virtual computing resources to unload the game content in order to be allocated in response to the subsequent request.

3. The computer-implemented method of claim 1, further comprising:
   allocating, for the set of warmed virtual computing resources, an amount of capacity sufficient to host the game server for the gaming application, the amount of capacity and a configuration for the capacity specified by a gaming package stored for the gaming application.

4. The computer-implemented method of claim 3, wherein the amount of capacity includes at least one of an amount of compute capacity, storage capacity, or bandwidth.

5. The computer-implemented method of claim 1, further comprising:
   receiving a subsequent request for a second game server to host an active session for the gaming application;
   determining that there are no warmed virtual computing resources available for the gaming application; and
   allocating a new virtual computing resource to function as the second game server for the active session.

6. The computer-implemented method of claim 1, further comprising:
   receiving the request to an application programming interface (API) of the multi-tenant environment, the information received from one of a game manager or a player device associated with the gaming application.

7. A computer-implemented method, comprising:
   receiving a request to launch a gaming session for a gaming application;
   determining an amount of resource capacity for a game server to host the gaming session;
   allocating, from a pool of available resource capacity, the amount of resource capacity, using one or more resources in a shared resource environment, to function as the game server to host the gaming session;
   determining that the gaming session has completed; and causing the resource capacity to be returned to the pool of available capacity in the shared resource environment.

8. The computer-implemented method of claim 7, further comprising:
determining that the pool of available resource capacity exceeds a minimum amount of available capacity; and
launching one or more warmed virtual computing resources using at least a portion of the available resource capacity, the warmed virtual computing resources loading an initial subset of content for the gaming application enabling the warmed virtual computing resources to perform an initial game task.

9. The computer-implemented method of claim 8, further comprising:
causing a selected virtual computing resource, of the warmed virtual computing resources, to load a remaining subset of content for the gaming application to function as the game server for the gaming session.

10. The computer-implemented method of claim 7, further comprising:
receiving a subsequent request for at least a portion of the available resource capacity; and
causing at least one of the warmed virtual computing resources to unload the game content in order to be allocated in response to the subsequent request.

11. The computer-implemented method of claim 7, further comprising:
allocating, for each of the one or more warmed virtual computing resources, an amount of capacity sufficient to host the game server for the gaming application, the amount of capacity and a configuration for the capacity specified by a gaming package stored for the gaming application.

12. The computer-implemented method of claim 11, further comprising:
enabling a game administrator to adjust the amount of resource capacity through changes to the configuration in the gaming package.

13. The computer-implemented method of claim 7, wherein the amount of capacity includes at least one of an amount of compute capacity, storage capacity, or bandwidth.

14. The computer-implemented method of claim 7, further comprising:
receiving a subsequent request for a second game server to host a gaming session for the gaming application;
determining that there are no warmed virtual computing resources available for the gaming application; and
allocating a new virtual computing resource to function as the second game server for the active session.

15. The computer-implemented method of claim 7, further comprising:
waiting for a quorum of player requests to be received for the gaming session before causing the amount of resource capacity to function as the game server to host the gaming session.

16. A system, comprising:
at least one processor; and
memory including instructions that, when executed by the at least one processor, cause the system to:
receive a request to launch a gaming session for a gaming application;
determine an amount of resource capacity for a game server to host the gaming session;
allocate, from a pool of available resource capacity, the amount of resource capacity, using one or more resources in a shared resource environment, to function as the game server to host the gaming session;
determine that the gaming session has completed; and
cause the resource capacity to be returned to the pool of available capacity in the shared resource environment.

17. The system of claim 16, wherein the instructions when executed further cause the system to:
determine that the pool of available resource capacity exceeds a minimum amount of available capacity; and
launch one or more warmed virtual computing resources using at least a portion of the available resource capacity, the warmed virtual computing resources loading an initial subset of content for the gaming application enabling the warmed virtual computing resources to perform an initial game task.

18. The system of claim 16, wherein the instructions when executed further cause the system to:
cause a selected virtual computing resource, of the warmed virtual computing resources, to load a remaining subset of content for the gaming application to function as the game server for the gaming session.

19. The system of claim 16, wherein the instructions when executed further cause the system to:
receive a subsequent request for at least a portion of the available resource capacity, the subsequent request unrelated to the gaming application; and
cause at least one of the warmed virtual computing resources to unload the game content in order to be allocated in response to the subsequent request.

20. The system of claim 15, wherein the instructions when executed further cause the system to:
allocate, for each of the one or more warmed virtual computing resources, an amount of capacity sufficient to host the game server for the gaming application, the amount of capacity and a configuration for the capacity specified by a gaming package stored for the gaming application.

* * * * *